United States Patent [19]
Budd et al.

[11] Patent Number: 6,064,523
[45] Date of Patent: May 16, 2000

[54] APPARATUS FOR POLARIZATION CONVERSION

[75] Inventors: Russell Alan Budd, North Salem; Derek Brian Dove, Mt. Kisco; Alan Edward Rosenbluth, Yorktown Heights, all of N.Y.

[73] Assignee: International Business Machines Corporation, Armonk, N.Y.

[21] Appl. No.: 09/106,783

[22] Filed: Jun. 29, 1998

[51] Int. Cl.[7] .................................................... G02B 5/30
[52] U.S. Cl. ............................ 359/485; 359/487; 362/19
[58] Field of Search ................................... 359/483, 485, 359/487, 495; 362/19

[56] References Cited

U.S. PATENT DOCUMENTS

| | | | |
|---|---|---|---|
| 3,566,099 | 2/1971 | Makas | 362/19 |
| 3,631,288 | 12/1971 | Rogers | 359/487 |
| 5,381,278 | 1/1995 | Shingaki et al. | 359/256 |
| 5,452,128 | 9/1995 | Kimura | 359/487 |
| 5,535,054 | 7/1996 | Shibuya | 359/487 |

*Primary Examiner*—Darren E. Schuberg
*Attorney, Agent, or Firm*—Scully, Scott, Murphy & Presser; Daniel P. Morris, Esq.

[57] ABSTRACT

An apparatus for polarization conversion having a light source for supplying vertically and horizontally linearly polarized light to an optical path and a parabolic mirror disposed in the optical path and proximate to the light source. In different embodiments, the parabolic mirror has a mirror coating to induce a phase shift of 0°, 90°, or an arbitrary phase shift between incident light and reflected light. A polarizer, preferably a reflective polarizer film, is disposed in the optical path for reflecting light of one of the linear polarizations and for transmitting the other linear polarization. Lastly, one or more waveplates are disposed in the optical path between the polarizer and the parabolic mirror. The waveplates have opposing segments each having axes which are antiparallel to each other for recycling the reflected linear polarization by converting it to the transmitted polarization.

5 Claims, 10 Drawing Sheets

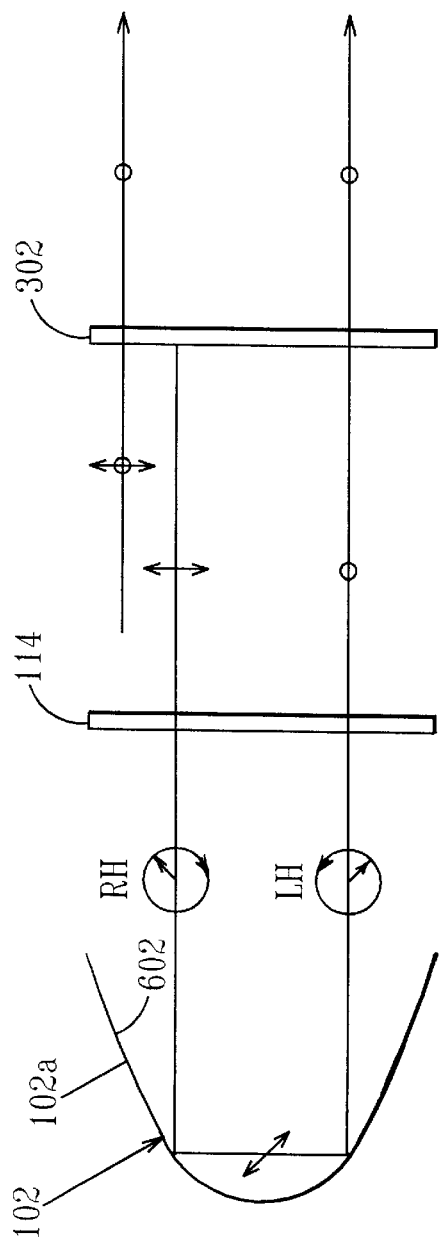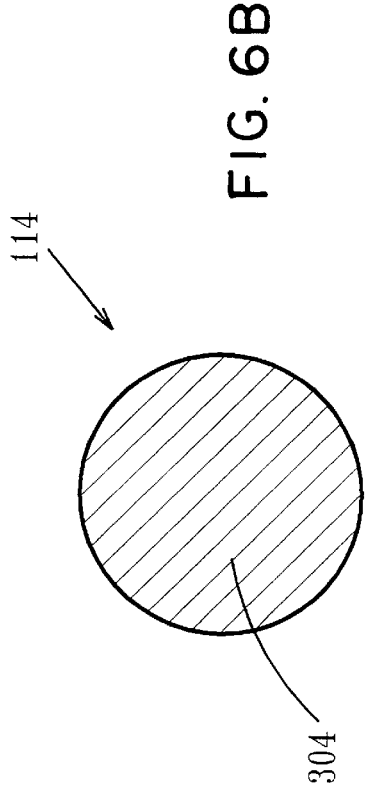
FIG. 6A
FIG. 6B

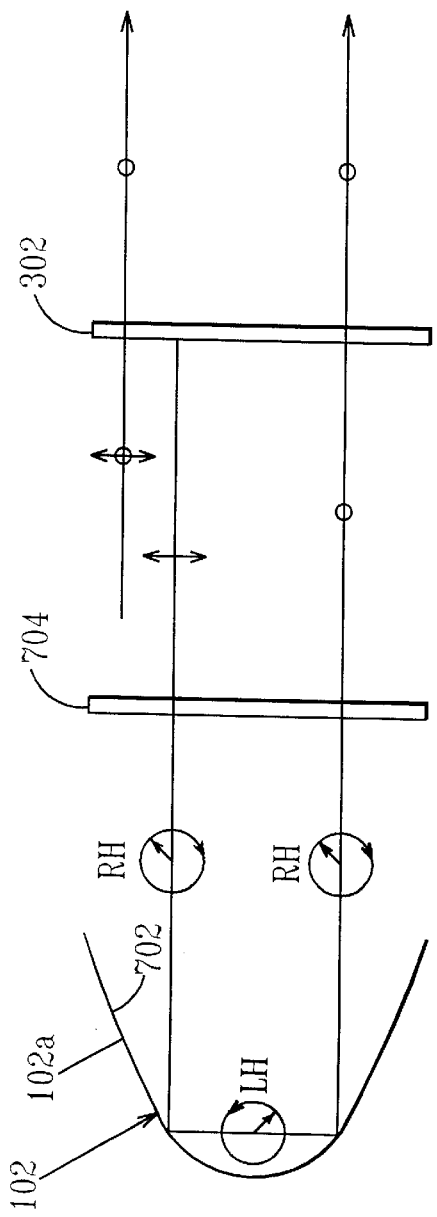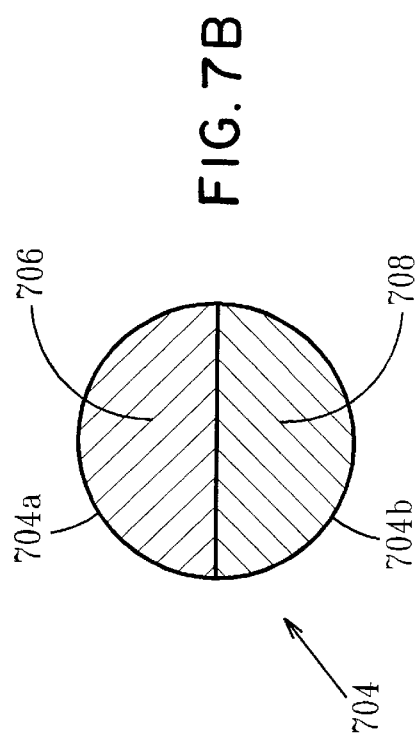

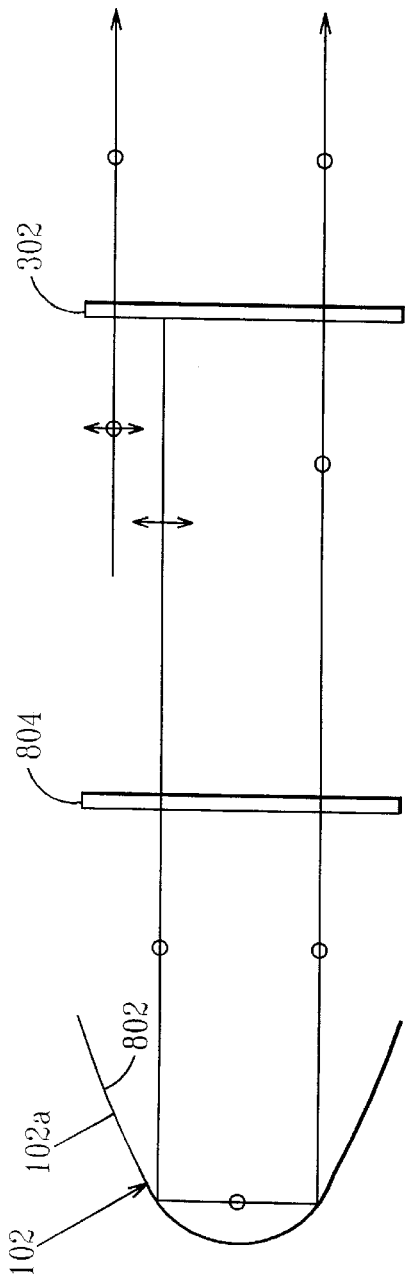
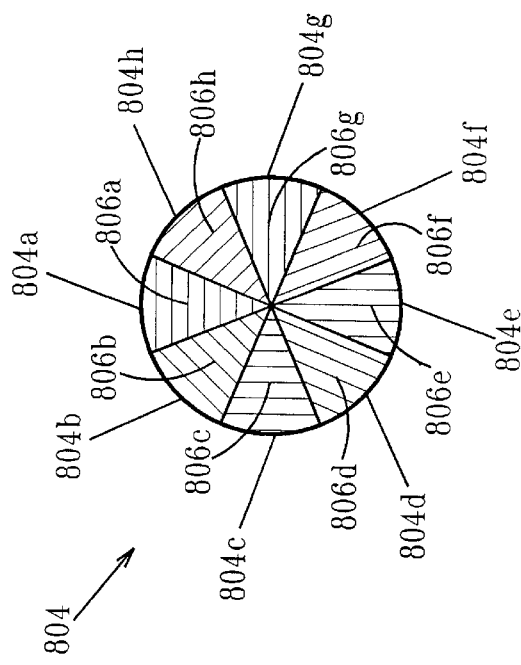
FIG. 8A
FIG. 8B

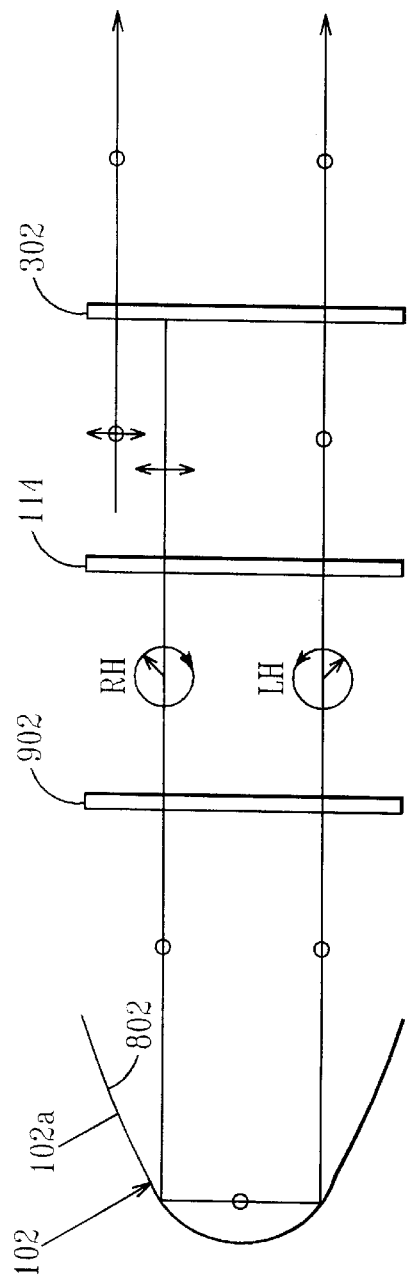

APPARATUS FOR POLARIZATION CONVERSION

BACKGROUND OF THE INVENTION

1. Field of the Invention

The field of art to which this invention relates is an apparatus for polarization conversion. It is more particularly directed to such apparatus which make use of reflective polarizer films and light sources having parabolic mirrors.

2. Discussion of the Prior Art

Intensity in optical projectors is usually limited by source brightness. In addition, projectors that use polarized light, such as many projection displays, suffer further intensity loss if the unused polarization is discarded. Frequently, an effort is made to capture the rejected component and re-inject it into the system after rotating its polarization to match that of the primary component. FIG. 1 illustrates a known arrangement for accomplishing this.

FIG. 1 shows a lamp 102 providing light having both S and P linear polarizations (where S polarization is denoted by "o" and P polarization is denoted by "○"). The light enters a polarization beam splitter (PBS) cube 104 which transmits light of one of the polarizations, P polarization in this example, and reflects light of the other polarization, S polarization in this example. The reflected S polarized light is again reflected by a mirror 106 and directed towards a ½ waveplate 108, where its polarization is converted to P polarization. Thus, the incident light is converted to one polarization and directed to a lens 110 or other optical component.

Two problems with the FIG. 1 approach are added cost and the need to increase optical etendue (NA times field size) when one polarized source image is, by itself, large enough to fill the lens pupil. Increases in etendue add to cost, and the most cost effective step is usually to use a large enough lamp 1 that the image in a single polarization almost fills the pupil aperture chosen; this reduces the benefit from re-injecting the second polarization. Because of arc inhomogeneities, the FIG. 1 arrangement can, in practice, still provide some intensity increase, but the benefit is limited.

A known way to partially circumvent the etendue problem is to recycle the converted polarization through the arc, as shown in FIG. 2. It is thermodynamically impossible to increase the brightness of a black-body source of fixed temperature, but arc discharges are not fully opaque. The FIG. 2 system increases the effective source emissivity by redirecting rays through the arc. (Emissivity equals absorbance, according to Kirchoff's Law. By tracing rays backwards through the FIG. 2 system, one can see that the recycling elements also increase arc absorbance).

FIG. 2 shows a lamp 102 having a parabolic mirror 102a. The lamp provides both S and P polarized light, both of which pass through a ¼ waveplate 114 and are directed to a PBS 104. The P polarized light is transmitted 116 and the S polarized light 118 is reflected to a mirror 112. The S polarized light is then reflected back to the PBS 104 and again reflected back towards the parabolic mirror 102a, first passing through the ¼ waveplate where it is converted to circular polarized light having a right handedness 120. The circularly polarized light having a right handedness 120 is then reflected by the parabolic mirror 102a which converts its handedness to left-handedness 122. This light then reflects of the opposite side of the parabolic mirror 102a which converts its handedness back to right handedness 124. The circular polarized light having a right handedness 124 then passes back through the ¼ waveplate 114 once again, which converts the light back to linear polarized light but having S polarization 126. The S polarized light 126 is then reflected once again by the PBS 104 towards the mirror 112, and back again towards the lamp 102. In this embodiment, an increase in brightness is not obtained unless there is a phase difference between the S and P components of the reflected light at the parabolic mirror 102a.

The return mirror 112 in the FIG. 2 system can be slightly tipped so that the two arc images are only partially overlapped; this can improve collected intensity when the system is not fully brightness-limited (due to arc inhomogeneities). However, in practice, the FIG. 2 arrangement is typically reported to have limited efficiency in converting the returned polarization to the desired output state. Also, in most projectors, the PBS 104 in the FIG. 2 system must be added as a new component (though in a few systems, a PBS 104 already present in the optics can also perform the recycling function). A PBS 104 is a fairly expensive optical component.

What is needed is a way to improve the efficiency of recycling and, at the same time, lower its cost.

SUMMARY OF THE INVENTION

Therefore, it is an object of the present invention to provide an apparatus for polarization conversion which overcomes the deficiencies of the prior art.

Accordingly, a first embodiment of an apparatus for polarization conversion is provided. The apparatus of the first embodiment comprises a light source for supplying vertically and horizontally linearly polarized light to an optical path and a parabolic mirror disposed in the optical path and proximate to the light source. The parabolic mirror has a mirror coating to induce a phase shift of 90° between incident light and reflected light. A polarizer means is disposed in the optical path for reflecting light of one of the linear polarizations and for transmitting the other linear polarization. Lastly, a ¼ waveplate is disposed in the optical path between the polarizer means and the parabolic mirror. The ¼ waveplate has quarter wave retardance for converting the reflected linear polarization from the polarizer means to circular polarization before being incident upon the parabolic mirror and for converting the reflected circular polarization from the parabolic mirror to the transmitted polarization which is directed towards, and transmitted by, the polarizer means.

A second embodiment of an apparatus for polarization conversion is also provided. The apparatus of the second embodiment comprises a light source for supplying vertically and horizontally linearly polarized light to an optical path and a parabolic mirror disposed in the optical path and proximate to the light source. The parabolic mirror having a mirror coating to induce a phase shift of 0° between incident light and reflected light. A polarizer means is disposed in the optical path for reflecting light of one of the linear polarizations and for transmitting the other linear polarization. Lastly, a ¼ waveplate is disposed in the optical path between the polarizer means and the parabolic mirror. The ¼ waveplate has opposing segments each having quarter wave retardance but having axes which are antiparallel to each other, for converting the reflected linear polarization from the polarizer means to circular polarization through one of the segments before being incident upon the parabolic mirror and for converting the reflected circular polarization from the parabolic mirror to the transmitted polarization through the other segment which is directed towards, and transmitted by, the polarizer means.

A third embodiment of an apparatus for polarization conversion is also provided. The apparatus of the third embodiment comprises a light source for supplying vertically and horizontally linearly polarized light to an optical path and a parabolic mirror disposed in the optical path and proximate to the light source. The parabolic mirror has a mirror coating which may induce an arbitrary phase shift between incident light and reflected light. A polarizer means is disposed in the optical path for reflecting light of one of the linear polarizations and for transmitting the other linear polarization. Lastly, a ½ waveplate is disposed in the optical path between the polarizer means and the parabolic mirror. The ½ waveplate has a plurality of segment pairs. Wherein each individual segment has half wave retardance, opposes the other individual segment of the pair, and has axes which are antiparallel to the opposing individual segment of the pair, for converting the reflected linear polarization from the polarizer means to a rotated linear polarization through one of the segments before being incident upon the parabolic mirror and for converting the reflected linear polarization from the parabolic mirror to the transmitted polarization through the opposing segment which is directed towards, and transmitted by, the polarizer means.

A fourth embodiment of an apparatus for polarization conversion is also provided. The apparatus of the fourth embodiment comprises a light source for supplying vertically and horizontally linearly polarized light to an optical path and a parabolic mirror disposed in the optical path and proximate to the light source. The parabolic mirror has a mirror coating which may induce an arbitrary phase shift between incident light and reflected light. A polarizer means is disposed in the optical path for reflecting light of one of the linear polarizations and for transmitting the other linear polarization. A first ¼ waveplate is disposed in the optical path between the polarizer means and the parabolic mirror for converting the reflected linear polarization to light having a circular polarization. Lastly, a second ¼ waveplate is disposed in the optical path between the polarizer means and the parabolic mirror, the second ¼ waveplate having a plurality of segment pairs. Wherein each individual segment has quarter wave retardance, opposes the other individual segment of the pair, and has axes which are antiparallel to the opposing individual segment of the pair, for converting the light having circular polarization from the first ¼ wave plate to the transmitted linear polarization through one of the segments before being incident upon the parabolic mirror and for converting the reflected transmitted linear polarization from the parabolic mirror to circular polarization through the opposing segment which is directed towards the first ¼ waveplate, converted to the transmitted polarization thereby, and directed to, and transmitted by, the polarizer means.

In preferred variations of the embodiments of the present invention, the polarizer means is a reflective polarizer film, such as DBEF manufactured by the 3M Corporation.

BRIEF DESCRIPTION OF THE DRAWINGS

Further features and advantages of the invention will become more readily apparent from a consideration of the following detailed description set forth with reference to the accompanying drawings, which specify and show preferred embodiments of the invention, wherein like elements are designated by identical references throughout the drawings; and in which:

FIG. 6A illustrates a schematic view of a first embodiment of the polarization conversion apparatus of the present invention.

FIG. 6B illustrates a front view showing the axes orientation of the ¼ waveplate of the polarization conversion apparatus of FIG. 6A.

FIG. 7A illustrates a schematic view of a second embodiment of the polarization conversion apparatus of the present invention.

FIG. 7B illustrates a front view showing the axes orientation of the ¼ waveplate of the polarization conversion apparatus of FIG. 7A.

FIG. 8A illustrates a schematic view of a third embodiment of the polarization conversion apparatus of the present invention.

FIG. 8B illustrates a front view showing the axes orientation of the ½ waveplate of the polarization conversion apparatus of FIG. 8A.

FIG. 9A illustrates a schematic view of a fourth embodiment of the polarization conversion apparatus of the present invention.

FIG. 9B illustrates a front view showing the axes orientation of the first ¼ waveplate of the polarization conversion apparatus of FIG. 9A.

FIG. 9C illustrates a front view showing the axes orientation of the second ¼ waveplate of the polarization conversion apparatus of FIG. 9A.

FIG. 9D illustrates a front view showing the axes orientation of the reflective polarizer film of the polarization conversion apparatus of FIG. 9A.

DETAILED DESCRIPTION OF THE INVENTION

Figure 1:
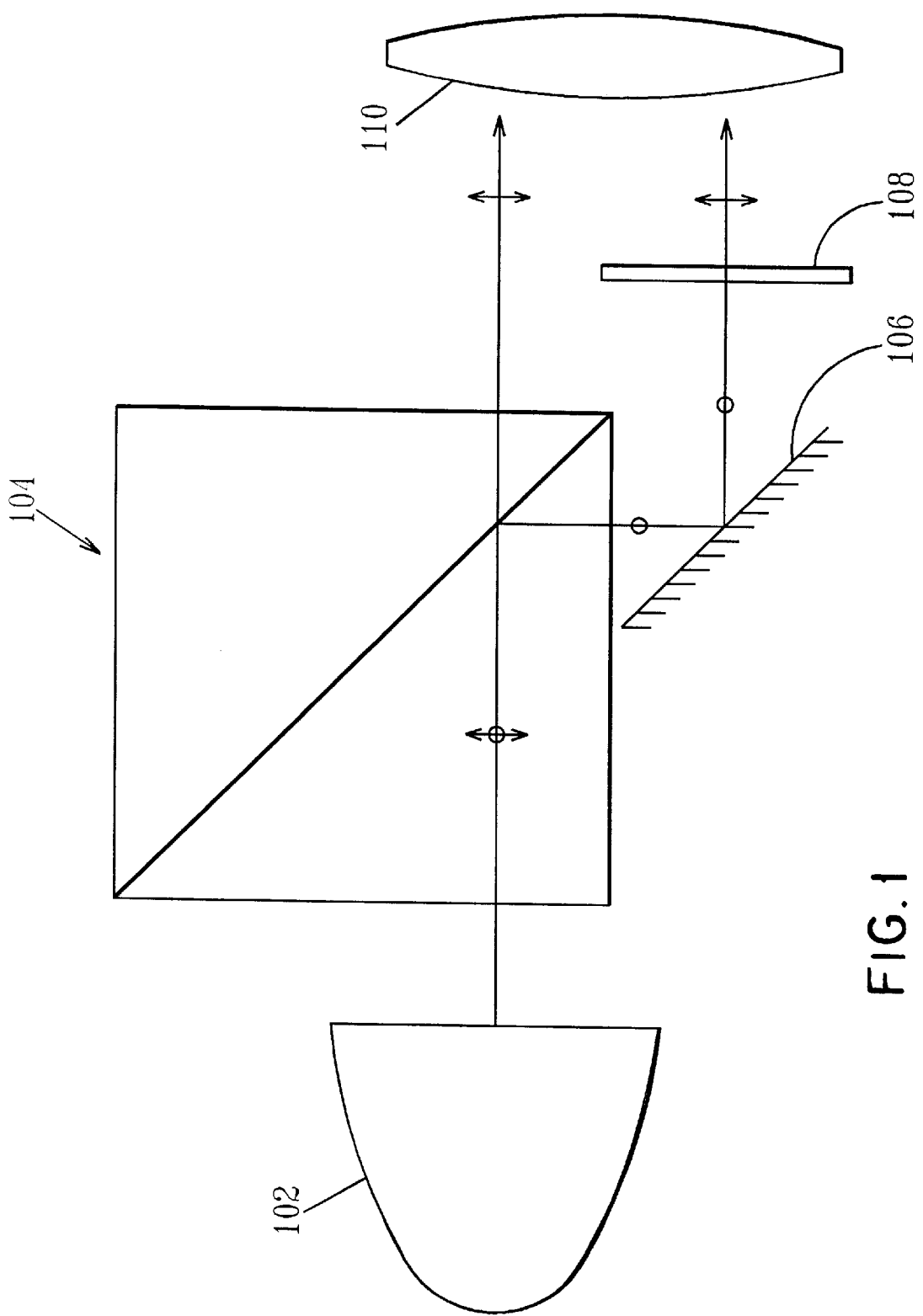
FIG. 1 illustrates a schematic view of a prior art polarization conversion apparatus.
Figure 2:
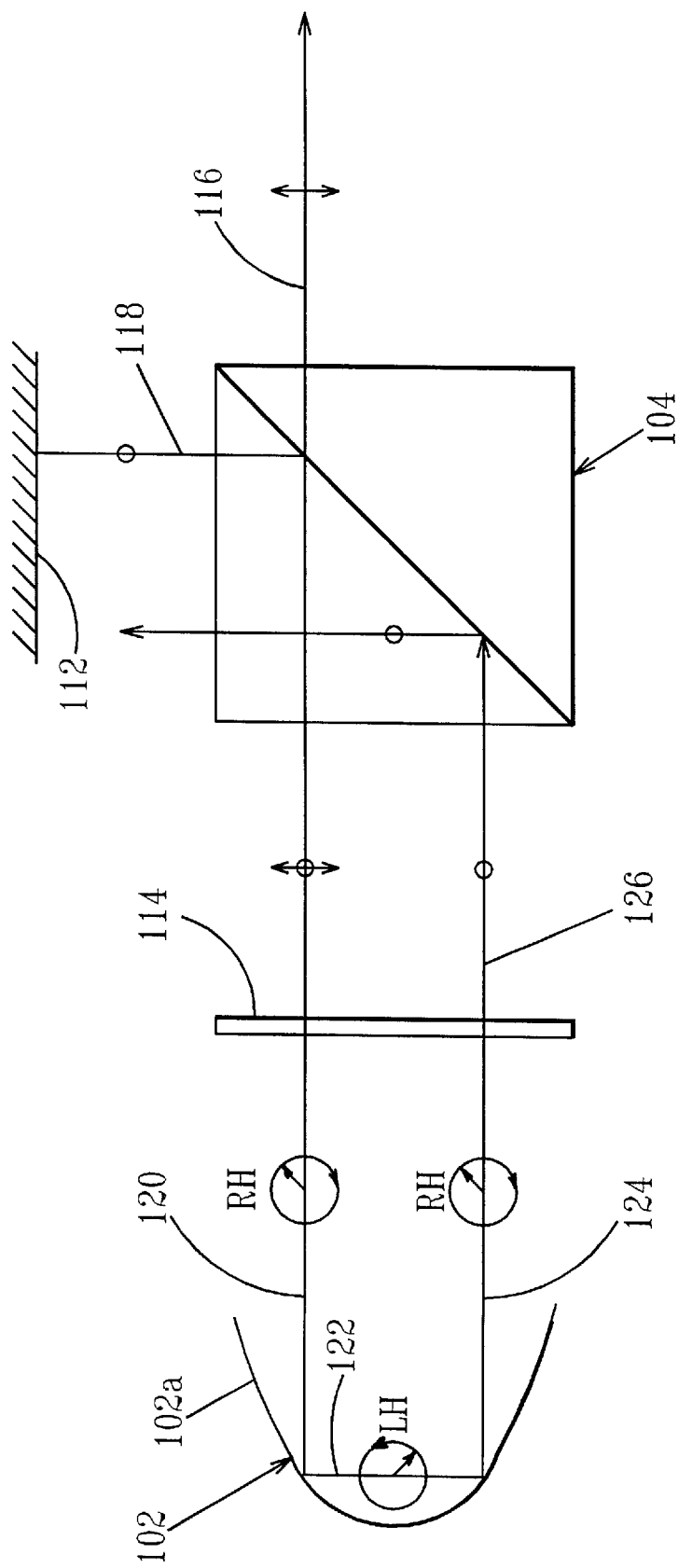
FIG. 2 illustrates a schematic view of a yet another prior art polarization conversion apparatus.
Figure 3A:
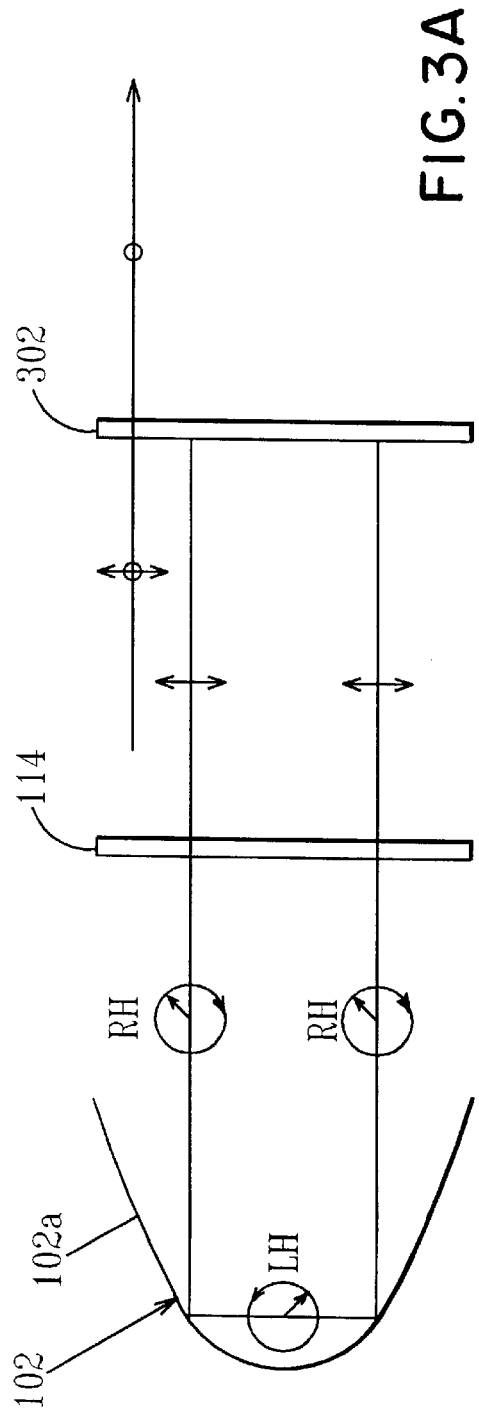
FIG. 3A illustrates a schematic view of the polarization conversion system of FIG. 2 with a reflective polarizer film replacing the PBS of FIG. 2.
Figure 3B:
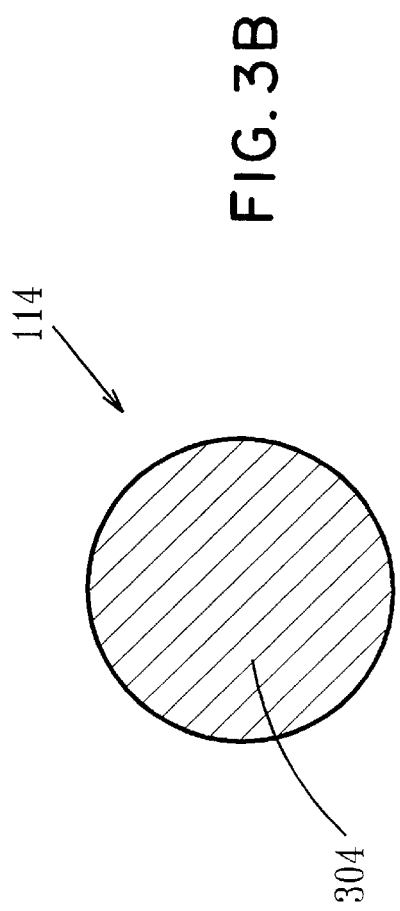
FIG. 3B illustrates a front view showing the axes orientation of the ¼ waveplate of the polarization conversion apparatus of FIG. 3A.

Referring now to FIG. 3A there is illustrated how the cost of the FIG. 2 arrangement can be reduced by replacing the PBS, or polarizer means with a sheet of inexpensive polarizing polymer 302, such as DBEF manufactured by 3M corporation. This material has the property of reflecting one polarization while transmitting the other. Because the DBEF sheet 302 is thin, the recycled polarization is reflected back into the lamp paraboloid from a somewhat closer distance than in the FIG. 2 arrangement; this slightly improves efficiency. FIG. 3B illustrates the orientation of the axes 306 of the quarter waveplate of the embodiment shown in FIG. 3A.

Figure 4A:
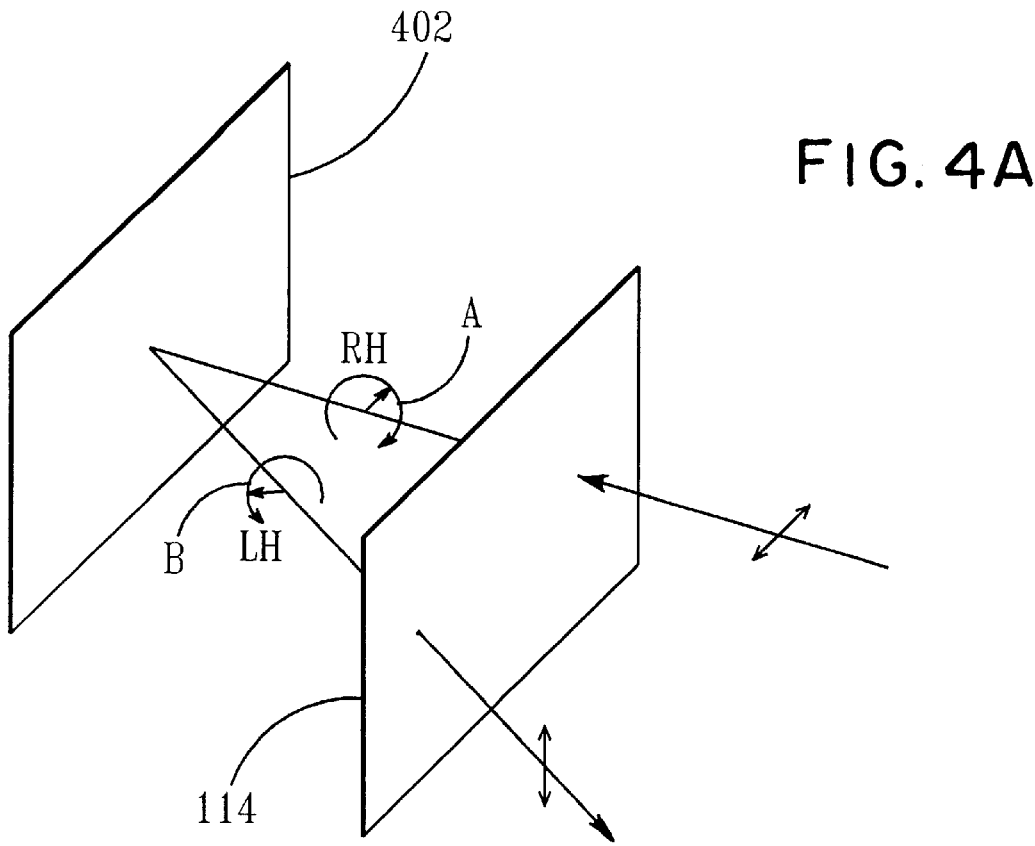
FIGS. 4A and 4B illustrate optical principles of the present invention with regard to flat and roof mirrors.
Figure 4B:
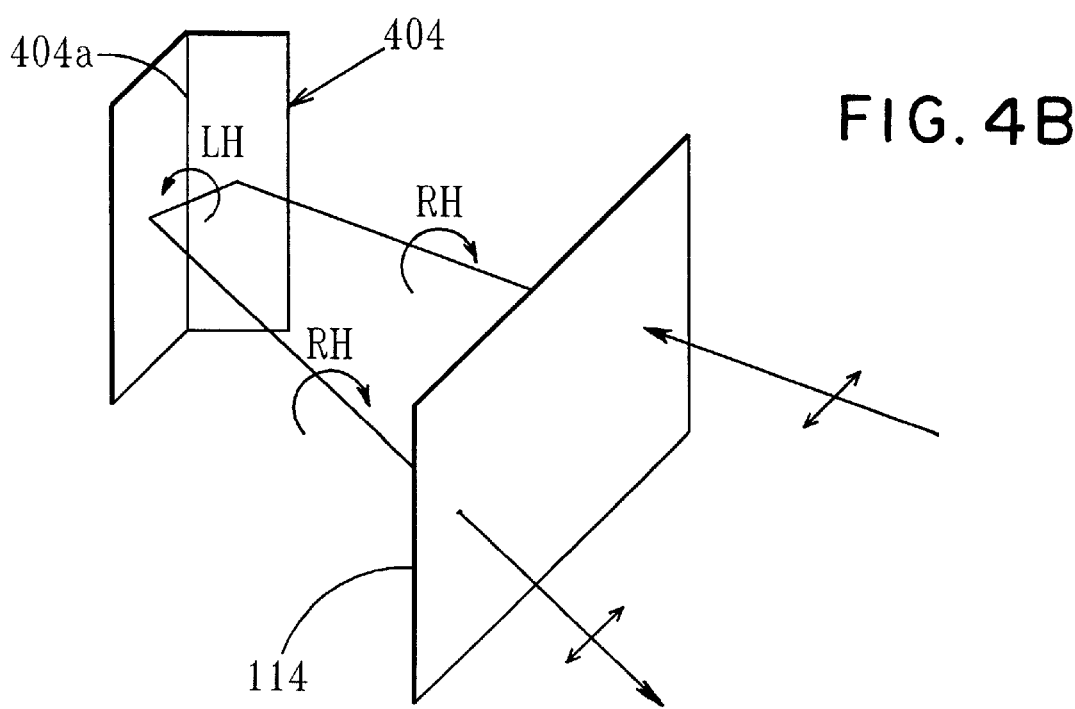

However, our work has shown that the arrangements of FIGS. 2 and 3A suffer from another efficiency limitation, explained in FIGS. 4A and 4B. The quarterwave retarder 114 customarily used for polarization conversion in reflection does not work well with a parabolic mirror 102a. A flat mirror 402, shown in FIG. 4A (at normal incidence) does not change polarization. Similarly, when circular polarized light reflects from the flat mirror 402, as shown in FIG. 4A, the reflected e-field rotates in the same direction as the incident field, as discussed above, when circular polarized light reflects from the flat mirror 402, the reflected e-field rotates in the same direction as the incident field, but the handedness is counted as reversed (shown schematically the Arrows A and B, with Arrow A labeled RH for right-handedness e-field, and arrow B labeled LH for left-handedness e-field). This explains the well-known function of a quarterwave recycler 114 in front of a flat mirror 402. The two passes that the reflected beam makes through the quarterwave plate 114 have the same effect as passage through a halfwave plate, namely, to rotate the input polarization to the desired output state.

Figure 5A:
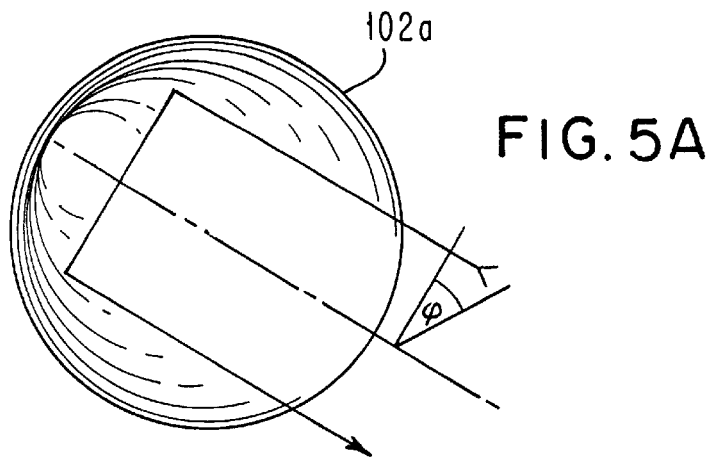
FIGS. 5A–C illustrate the optical similarities between a roof mirror and a parabolic mirror as used in the apparatus of the present invention.
Figure 5B:
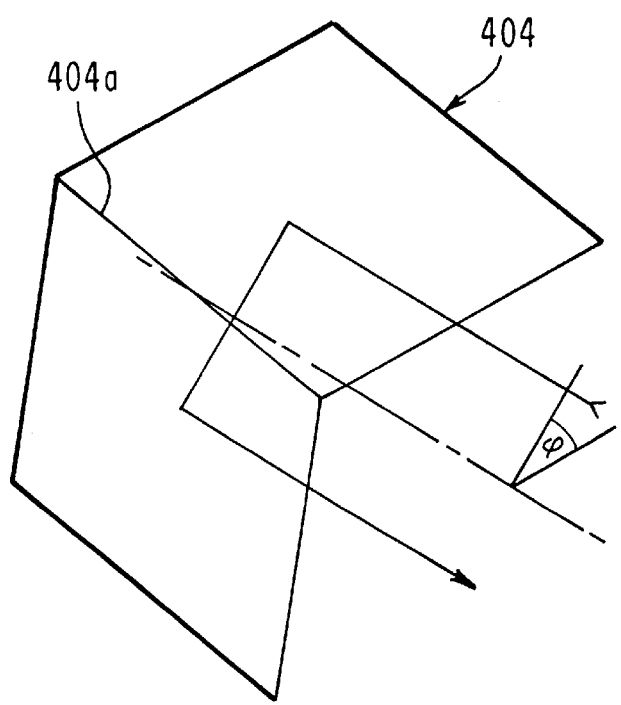
Figure 5C:
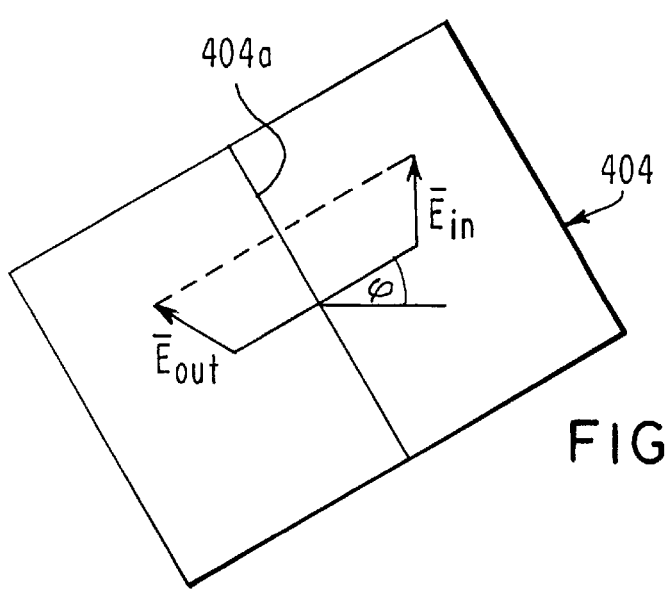

However (considered in the meridian that a particular ray transverses), a parabolic lamp reflector 102a resembles a roof mirror 404 (i.e., a "V" mirror), shown in FIG. 4B, rather than a flat mirror 402. This is illustrated in FIGS. 5A–5C, which shows that the purely "geometrical" effect of a roof mirror 404 is to invert the electric field vector about the line corresponding to the spine 404a of the roof mirror 404. In the case of a paraboloid, the spine 404a of the equivalent roof mirror 404 is perpendicular to the meridian within which the ray reflects. For a particular ray, this meridian is tilted at some angle $\phi$ to the horizontal.

The parabola's effect on recycled polarization is further complicated by the S-P phase shift that the mirror coating will usually introduce (in general, a different phase shift in each of the two ray reflections). If $\psi$ is the average of these two phase shifts, then our work has shown that the parabola's polarization properties usually mix those of an ideal roof mirror 404 with those of a flat mirror 402. Specifically, the polarization operator (e.g., Jones Matrix) of the parabola is found with respect to equation 1 to be:

$$P(\phi,\psi)=\cos\psi V(\phi)+\sin\psi M \quad (1)$$

where $V(\phi)$ is the operator for a tilted roof mirror 404 and M the operator for a flat mirror 402.

Referring now to FIGS. 6A and 6B there is illustrated an embodiment of the present invention in which the parabolic mirror 102a of FIG. 3A is coated with a mirror coating 602 whose phase shift $\psi$ is approximately 90°. In this case P≅M according to the above equation; thus, where polarization properties are concerned, the parabolic mirror 102a functions as a plane mirror. FIG. 6A shows that (as is well-known for a plane mirror), the input circular polarization (produced by the quarterwave plate 114 when the recycled beam from the reflective polarizer film 302 is reflected toward the parabolic mirror 102a) has its handedness reversed by the parabolic mirror 102a when $\psi$=90°, and therefore is converted to linear polarization after the second pass through the quarterwave plate 114. As desired, this output linear polarization is in the pass direction of the DBEF film 302 (i.e., it is transmitted). To help achieve a 90° average phase shift, each half of the paraboloid can be coated with a different mirror stack; only the average phase need be held near 90°. (The two different coatings can be applied to left and right sections of the parabola, or to front and back sections.) A further modest improvement can be made by adding a small curvature (not shown) to the substrate of the reflective DBEF film, or by adding an equivalent weak refractive element (not shown). FIG. 6B illustrates the orientation of the axes 304 of the quarter waveplate 114 of the embodiment shown in FIG. 6A.

Referring now to FIG. 7A, there is illustrated another embodiment of the present invention wherein the average phase shift $\psi$ of the mirror coating 702 is set at 0°. The recycling element for this embodiment is a split quarterwave plate 704, as shown in FIG. 7B. Each half 704a, 704b of the quarter waveplate 704 has a quarterwave retardance, but the waveplate axes 706, 708 in the halves 704a, 704b, respectively, are antiparallel. Preferably, the two halves 704a, 704b might be cut from the same sheet and then one piece reversed front-to-back. This is because $\phi$=0, the parabolic mirror 102a behaves as an ideal roof mirror 404. In this case, the circular polarization input to the parabolic mirror 102a remains circular polarized at the output, but inversion of the roof 404 (illustrated in FIG. 5C) causes the output e-field to rotate in the opposite direction from the input. Because the return ray also propagates in the reverse direction, this opposite rotation actually implies the same handedness of polarization. Similarly, when circular polarized light reflects from a flat mirror 402, as shown in FIG. 4A, the reflected e-field rotates in the same direction as the incident field, similarly, when circular polarized light reflects from a flat mirror 402, the reflected e-field rotates in the same direction as the incident field, but the handedness is counted as reversed. This is the reverse of the situation obtained in the embodiment of FIG. 6A (where $\psi$=90°). Thus, in the embodiment of FIG. 7A, it is necessary to rotate the quarterwave 704 plate in the return section (i.e., the lower half 704b) by 90°, whereas in FIG. 6A, a unified quarterwave plate 114 is used.

It can be difficult to achieve a nearly constant phase shift from the parabolic mirror coating 602, 702 over all wavelengths and incidence angles, particularly if it is also desired that the parabolic mirror 102a provide UV/IR filtering. FIG. 8A shows an embodiment that provides the desired polarization recycling independent of coating 602, 702 phase shift, thus the parabolic mirror 102a has a coating 802 to induce an arbitrary phase shift between incident light and reflected light. Each half of the recycling element 804 is equivalent to a halfwave retarder with continuously rotating axes 806a14 806h. This is achieved to an adequate approximation by dividing the element 804 into "pie slices," or segments 804a–804h as shown in FIG. 8B, where each segment 804a–804h is cut with axes 806a–806h, respectively, in the desired orientation. The segments are in the form of opposing segment pairs (i.e., a first pair comprises segments 804a and 804e, a second pair comprises segments 804b and 804f, etc.) The allowable angular width of each segment is determined by how far $\psi$ departs from 90°. A ray incident in a meridian at angle $\phi$ passes through a retarder segment 804a–804h whose axes 806a–806h are oriented at an angle $\theta$=45°+$\phi$/2. If the light incident on this element 804 from the reflective polarizer film 302 has vertical polarization, the orientation of the segment causes the polarization to be rotated to P state during both reflections from the parabolic mirror 102a; in pure P (or S) state, the polarization is not distorted. When the output P light returns to the recycling element, it sees a slice on the opposite side from the input segment (i.e., the other segment of the segment pair). (The ray is also incident on this exit slice from the rear face (i.e., inside face) instead of the front face (i.e., outside face). In the exit slice, the waveplate axes are oriented at an angle (90°$\phi$/2 as seen from the rear face). This orientation causes the polarization to be rotated into the horizontal plane, i.e., the polarization is rotated perpendicular to the input vertical plane. The recycled light is, therefore, transmitted on its return to the reflective polarizer film 302.

In this embodiment, as shown in FIG. 8A, the polarization is kept linear within the parabola, but is rotated to a direction that is either parallel to or perpendicular to the plane of the double reflection within the parabola. In these two preferred orientations, the polarization is not distorted by the phase shift from the parabola reflections.

If desired, a phase-independent recycling element can be implemented with quaterwave retarders instead of halfwave retarders. This is accomplished by using two quarterwave retarders 114, 902 in succession, as shown in FIG. 9A. As shown in FIG. 9B the outside retarder 114 is not segmented (i.e., it is a unified quarterwave film as is used in the embodiment of FIG. 6A); its axes 304 are oriented at 45° to the axes 303 of the reflective polarizer film 302, as shown in FIG. 9D. The axes 904a–904h of the segments 902a–902h in the inside quarterwave plate 902, as shown in FIG. 9C are aligned at 45° to the tilt of the ray meridian. After passing through the outside quarterwave plate 304, light is incident on the inside segments 904a–904h in circular polarization; the segment orientation is such as to convert the circular polarization to a pure S or P state during reflections in the parabolic mirror 102a. As in the FIG. 8A embodiment, polarization distortion is thereby avoided. The axes of the return segment must be oriented at 90° relative to those of the input segment (i.e., axes of segment 902a are oriented 90° relative to those of axes 904e of segment 902e).

Figure 10:
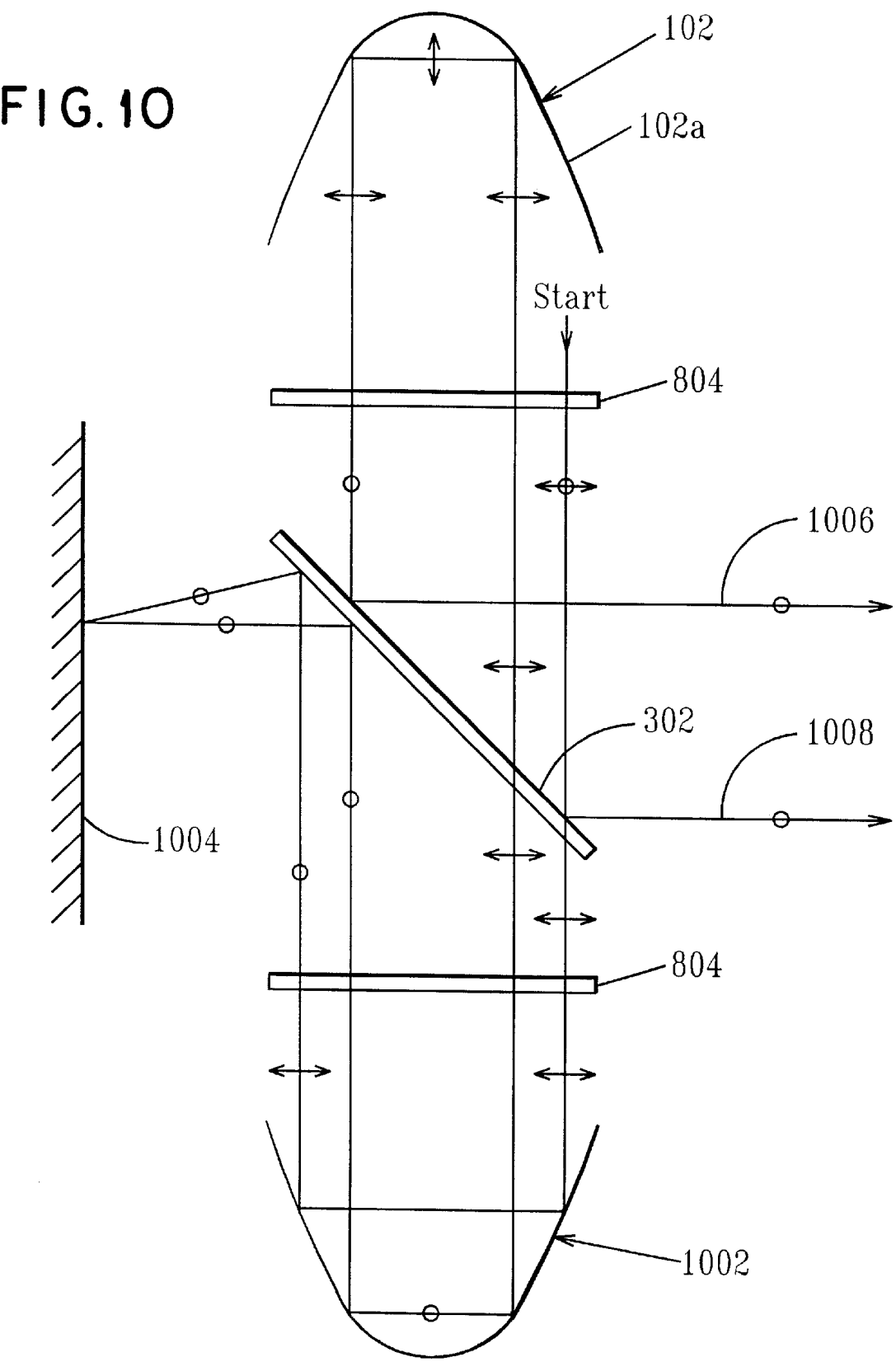
FIG. 10 illustrates a schematic view of a fifth embodiment of the polarization conversion apparatus of the present invention.

In some cases, it may be that arc emissivity does not reach unity even after both polarizations are imaged through it and/or it may be that the lens aperture is not fully filled even after the two arc images are overlapped side by side. In such cases, it is possible to get an additional increase in intensity from a second parabolic mirror 1002, as shown in FIG. 10. Between the first and second parabolic mirrors 102a, 1002, respectively, is positioned a reflective polarizer film 302 and segmented ½ waveplates 804, as discussed previously with regard to FIGS. 8A and 8B. A mirror 1004 is positioned adjacent to the reflective polarizer film 302.

In this arrangement, light from the first lamp 102 that is S polarized is reflected by the reflective polarizer film 302 and exits to the right into the remainder of the optical system, shown as light ray 1006. Light from the first lamp 102 that is P polarized is transmitted and enters the second parabolic mirror 1002. By employing the segmented ½ waveplates 804, light reflected by the second parabolic mirror 1002 has its polarization converted into the opposite direction (P into S). This P light is then directed back into the first parabolic mirror 102a whereupon its polarization is converted into S light which then is able to exit the system upon reflection from the mirror 1004 and the reflective polarizer film 302, shown as light ray 1008. Thus, only light having S polarization is allowed to exit the system, multiple bounces are employed to convert all the light into this desired S polarization.

The various embodiments of the invention are not limited to operation with 3M DBEF film. Cholesteric-LC material from other manufacturers can instead be used for the reflective polarizer.

When cooling is difficult, e.g., because of noise considerations, a PBS and mirror can replace the DBEF. Similarly, any number of pairs of opposing waveplate segments can be used in the embodiments of FIGS. 8 and 9. However, in the preferred embodiment four such pairs (eight segments) are utilized for greatest efficiency and lowest cost.

While the invention has been particularly shown and described with respect to illustrative and preferred embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. An apparatus for polarization conversion comprising:

a light source for supplying vertically and horizontally linearly polarized light to an optical path, a parabolic mirror disposed in the optical path and proximate to the light source, the parabolic mirror having a mirror coating to induce a phase shift of substantially 90° between incident light and reflected light, a polarizer means disposed in the optical path for reflecting light of one of the linear polarizations and for transmitting the other linear polarization, and a ¼ waveplate disposed in the optical path between the polarizer means and the parabolic mirror, the ¼ waveplate having quarter wave retardance for converting the reflected linear polarization from the polarizer means to circular polarization before being incident upon the parabolic mirror and for converting the reflected circular polarization from the parabolic mirror to the transmitted polarization which is directed towards, and transmitted by, the polarizer means.

2. The apparatus for polarization conversion of claim 1, wherein the transmitted polarization is S polarized and the reflected polarization is P polarized.

3. The apparatus for polarization conversion of claim 1, wherein the transmitted polarization is P polarized and the reflected polarization is S polarized.

4. The apparatus for polarization conversion of claim 1, wherein the polarizer means is a polarization beam splitter cube.

5. The apparatus for polarization conversion of claim 1, wherein the polarizer means is a reflective polarizer film.

* * * * *

UNITED STATES PATENT AND TRADEMARK OFFICE
CERTIFICATE OF CORRECTION

PATENT NO. : 6,064,523
DATED : May 16, 2000
INVENTOR(S) : Alan E. Rosenbluth, et al.

It is certified that error appears in the above-identified patent and that said Letters Patent are hereby corrected as shown below:

On The Title Page, [57] ABSTRACT: "polarizer and..." should read

--polarizer means and...--

Column 1, Line 22: " " should read -- --

Signed and Sealed this

Twenty-fourth Day of April, 2001

Attest:

NICHOLAS P. GODICI

Attesting Officer

Acting Director of the United States Patent and Trademark Office